United States Patent [19]

Mead

[11] 3,715,751

[45] Feb. 6, 1973

[54] DIGITAL SPEED GATE FOR DOPPLER RADAR

[75] Inventor: George S. Mead, Maynard, Mass.

[73] Assignee: Raytheon Company, Lexington, Mass.

[22] Filed: Sept. 30, 1970

[21] Appl. No.: 76,954

[52] U.S. Cl. .................. 343/7 A, 331/1 A, 343/5 DP, 343/8
[51] Int. Cl. ................................. G01s 9/44
[58] Field of Search .......... 343/5 DP, 7 A, 8; 331/1 A

[56] References Cited

UNITED STATES PATENTS

| 3,361,985 | 1/1968 | Schaefer | 331/1 A X |
| 3,295,127 | 12/1966 | Kross | 343/7 A |
| 3,449,691 | 6/1969 | Pasternack et al. | 331/1 A X |

Primary Examiner—T. H. Tubbesing
Attorney—Philip J. McFarland and Joseph D. Pannone

[57] ABSTRACT

A speed gate for a pulse Doppler or CW Doppler radar wherein a signal being tracked is fed, along with a signal from a digitally controlled oscillator, to an exclusive OR gate ro derive gating signals for clock pulses. such gated clock signals are then used to actuate an up-down counter to derive a digital number indicative of the average phase difference between the signal being tracked and the digitally controlled oscillator. Such number is combined with a digital number indicative of the phase difference, measured by the gated clock signals over a relatively short period, between the signal being tracked and the signal out of the digitally controlled oscillator to produce a digital correction signal for the digitally controlled oscillator to change the phase thereof until a phase lock condition occurs between the signals into the exclusive OR gate.

4 Claims, 1 Drawing Figure

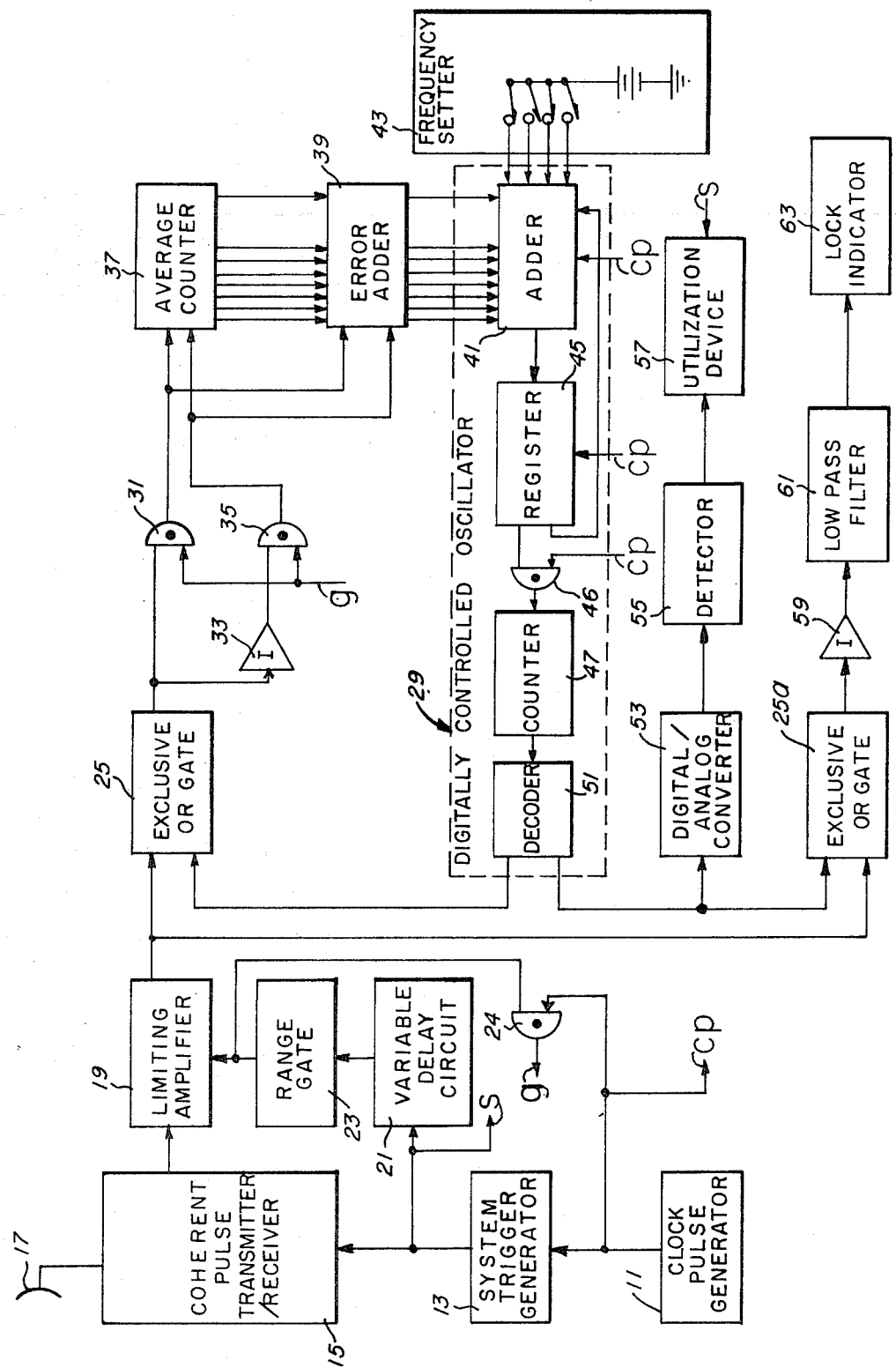

DIGITAL SPEED GATE FOR DOPPLER RADAR

The invention herein described was made in the course of or under a contract or subcontract thereunder, with the Department of Defense.

BACKGROUND OF THE INVENTION

It is known in the radar art that a Doppler tracker, commonly referred to as a "speed gate", may be used to advantage in lieu of a bank of Doppler filters in either a pulse Doppler or continuous wave Doppler radar. The principle of operation of the usual speed gate is similar to the principle of operation of the well-known AFC circuit ordinarily used in FM radio modified so as to phase lock a local oscillator with the received signal. That is, an analog correction signal, the magnitude and polarity of which is indicative of the phase difference between a signal being tracked and a local oscillator signal, is applied to such oscillator in such a manner as to force such phase difference to a predetermined value and the frequency difference to zero. The local oscillator in the just-mentioned type of system is a radio frequency voltage-controlled oscillator, as a klystron, referred to hereinafter as the VCO.

While satisfactory speed gates have been in use for many years, it has been recognized in the field that the use of analog techniques is not ideal. For example, it is necessary to adjust the VCO periodically to compensate for drift thereof or to accept reduced in-service accuracy of operation. If such adjustment is not made and the Doppler shift due to a target approaches the Doppler shift due to clutter, accuracy may be reduced to such an extent as to render the speed gate incapable of proper operation.

The shortcomings of analog techniques, as is well known, may be overcome by using digital techniques. Thus, it is theoretically possible to replace the conventional VCO with a digitally controlled oscillator, hereinafter sometimes referred to as the DCO in a speed gate, using appropriate converters in the control loop to change from analog to digital signals and vice-versa. In practice, however, the required converters are so complex as to make such an approach infeasible.

Therefore, it is a primary object of this invention to provide an improved speed gate for a pulse Doppler or CW Doppler radar system using digital techniques.

Another object of this invention is to provide an improved speed gate for a pulse Doppler or CW Doppler radar system which uses a digitally controlled oscillator.

Still another object of this invention is to attain the foregoing objects using known conventional devices and circuits.

SUMMARY OF THE INVENTION

These and other objects of this invention are attained generally by providing a speed gate for either a pulse Doppler or CW Doppler radar system in which: (a) the phase difference between the output of a digitally-controlled oscillator and the echo signal from a target being tracked is continuously measured by counting clock pulses which are gated in accordance with such difference; (b) generating a digital correction signal weighted in a predetermined manner in accordance with the average, over a selected period, and the instantaneous value of such difference; and, (c) applying such correction signal to the digitally controlled oscillator in such a manner as to force the digital correction signal to a predetermined value. The output of the digitally controlled oscillator then corresponds with the echo signal from the target being tracked and may be used in lieu thereof in the determination of the Doppler shift due to motion of the target and/or control of the radar system.

For a more complete understanding of this invention, reference is now made to the following description of a preferred embodiment of this invention and to the accompanying drawings.

BRIEF DESCRIPTION OF THE DRAWING

The single FIGURE is a simplified block diagram of a coherent pulse Doppler radar system showing in detail the arrangement of the contemplated speed gate.

DESCRIPTION OF THE PREFERRED EMBODIMENT

Referring now to the FIGURE it may be seen that a system according to this invention includes a conventional clock pulse generator 11, system trigger generator 13, coherent pulse transmitter/receiver 15, antenna 17, limiting amplifier 19, variable delay circuit 21 and range gate 23 arranged as indicated to produce an interrogating pulse and echo signals from illuminated targets (not shown) at the output of the limiting amplifier 19. The limiting amplifier 19 is a conventional "hard" limiter. It will be recognized that the signals at the output of the limiting amplifier 19 contain, in addition to echo signals from any targets by the range gate 23, some noise signals. The latter appear in the signal out of the limiting amplifier 19 as a square wave of random periodicity in contrast with the echo signals which are periodic square waves. In addition, in order to provide range gated clock pulses to the circuits to be described so that echo signals from unwanted targets may not affect operation of the contemplated speed gate, an AND gate 24 is enabled by the range gate 23.

The train of gated signals out of the limiting amplifier 19 is fed to one input terminal of an exclusive OR gate 25 and to one input terminal of an exclusive OR gate 25a. The second input terminal of the exclusive OR gate 25 is connected to a terminal (not numbered) of a digitally controlled oscillator 29, referred to as DCO 29 and described in more detail hereinafter. Suffice it to say here that the signal out of DCO 29 to exclusive OR gate 25 is a square wave differing in phase by 90° from the signal at the output terminal (not numbered) of the DCO 29 to exclusive OR gate 25a.

The exclusive OR gate 25 operates in a known manner to produce a "one" when its two input signals are out of phase and to produce a "zero" when the two are in phase. It may be seen, therefore, that if, as is the case here, the output of the exclusive OR gate 25 is connected directly to an AND gate 31 and, through an inverter 33, to an AND gate 35, the former gate is enabled when the input signals to the exclusive OR gate 25 are out of phase and the latter gate is enabled when the two such inputs are in phase. Thus, gated clock pulses from AND gate 24 are passed through either AND gate 31 or 35. The clock rate may be varied within wide limits so long as the frequency of the clock pulses is greater than twice the maximum frequency of the output signals from the exclusive OR gate 25, so as to meet the Nyquist sampling criterion under all conditions. The clock pulses, after gating through the AND gates 31, 35 are passed to a binary up-down counter 37 of conventional construction so as to cause that element, say, to count "up one" for each clock pulse passed through AND gate 31 and to count "down one" for each clock pulse passed through AND gate 35. A moment's thought will make it clear that, assuming a phase lock condition to exist between the signals from the DCO 29 and the signals out of the limiting amplifier 19, the output signal from the exclusive OR gate 25 will be a symmetrical square wave at twice the frequency of the two input signals. As a result, under the assumed condition, the AND gates 31, 35 will be enabled for equal periods and the binary up-down counter 37 will receive an equal number of "up one" counts and "down one" counts. It is also obvious that, if a phase lock does not exist between the two signals, the output of the exclusive OR gate 25 will be an asymmetric square wave and that, depending on existing conditions, a greater number of either "up one" counts or "down one" counts will be passed to the binary up-down counter 37 so that the total count of that element is indicative of the unbalance between "up one" and "down one" signals over a period of time. In other words, the binary up-down counter 37 acts as a digital integrator which operates linearly so long as it is not filled. The condition of the last stage of the binary up-down counter 37 may be used to determine the sign of the integration process, i.e., whether an excess of "up one" or "down one" counts exists. Similarly, by providing a larger capacity than would intuitively be required for the binary up-down counter 37, the average of the integration process over a period of time greater than the period of the signals out of the exclusive OR gate 25 may be determined by disregarding the least significant counts therein. The output of a number of more significant counts, i.e., the average indicated difference between "up one" and "down one" counts out of the binary up-down counter 37 are fed to an error adder 39, as shown, along with the gated clock pulses out of the AND gates 31, 35. The output of the error counter 39 then is equal to the average plus the difference between the "up one" and "down one" counts during each period of the signals out of the exclusive OR gate 25. Such a binary signal is then fed, as shown, to an adder 41 in the DCO 29 along with a binary signal from a frequency setter 43. The latter element in a practical case would be a computer (not here shown) adapted to produce a signal to set the DCO 29 roughly to a frequency at which phase lock would occur for any given signal being tracked. Such a signal is not essential to this invention because it merely reduces the capacity required in the error detection circuits just described. In the illustrated example, the frequency setter 43 simply consists of a number of single pole switches (not numbered) which may be selectively actuated so as to impress a voltage from a source (not numbered) on desired ones of the inputs to the adder 41.

The DCO 29 consists of the adder 41 and a register 45 connected as indicated so as to form an accumulator wherein the sum of the frequency setter 43 and the error adder 39 is added to itself at each clock pulse until the register 45 is filled. It is evident that such a connection causes the output of the register 45 to increase in a linear arithmetic progression with each clock pulse, the steps in such progression being equal to the sum of the input signals to the adder 41. Therefore, the number of clock pulses required to cause register 45 to be filled, i.e., the period of the DCO 29, is dependent on the sum of the signals out of the error adder 39 and the frequency setter 43. The register 45 is also connected, as shown, through AND gate 46, to pass pulses to a counter 47. The latter element, therefore, counts each "register filled" signal from the register 45. It is noted that the register 45 recycles automatically because signals from the error adder 39 and the frequency setter 43 maintain an input to the register 45. On the other hand, the counter 47 repetitively counts up from "zero" to a filled condition and then resets itself to "zero" as long as clock pulses are applied to the adder 41 and the register 45. The signal out of the counter 47 is fed to a decoder 51, which preferably consists of conventional diode decoding networks (not shown) to combine the output of the various stages of the counter 47 so that that component operates as a binary divider, counting repetitively, the last stage being at the DCO frequency and the next to last stage being at twice the DCO frequency. Thus, if the normal and complementary outputs of the last two stages are passed through a conventional exclusive OR gating arrangement, a symmetrical square wave shifted in phase by 90° from the normal output of the last stage is derived. Such a phase shifted wave is derived and applied to the exclusive OR gate 25 as shown.

The binary signal (unshifted) from the normal output of the last stage of the decoder 51 is fed, as shown, to a digital/analog converter 53 wherein such signal is converted to a sine wave having a period equal to the period of the last stage of the decoder 51. The resulting sine wave is then fed through a detector 55 and thence to a utilization device 57. The latter two elements may, for example, be a conventional detector and indicator.

As indicated, the binary signal (unshifted) from the normal output of the last stage of the decoder 51 is also fed to one input of exclusive OR gate 25a. As noted hereinbefore, the other input to exclusive OR gate 25a preferably is the same as exclusive OR gate 25. The output of exclusive OR gate 25a is fed through an inverter 59 and a low pass filter 61 to lock indicator 63. The low pass filter 59 preferably is a simple R-C circuit while the lock indicator 63 may be an indicator lamp. When a phase lock exists, the inputs to the exclusive OR gate 25a are identical and its output is low. This low output is inverted to a high signal by the inverter 59 and, after passing through the low pass filter 61, energizes the lock indicator 63. When there is no phase lock, the output of the inverter 59 decreases and, as a result, the lock indicator 63 is not energized. The low pass filter 61 prevents transients, as may occur when the described circuit is operating to phase lock the DCO 29 with the signal out of the limiting amplifier 19 or when noise perturbates the latter signal, from energizing the lock indicator 63.

Having described a preferred embodiment of this invention, it will be clear to those of skill in the art that alternative embodiments will equally well fulfill the concepts hereof. For example, the particular DCO shown may be replaced by any known DCO. Further, it will be evident that conventional synchronizing circuitry may be added to eliminate the possibility of misalignment between clock pulses and signals being processed. Still further, the output of the disclosed speed gate may be used for purposes other than that shown, as, for example, the input signal to a Doppler processor. It is felt, therefore, that this invention should not be restricted to its disclosed embodiment, but rather should be limited only by the spirit and scope of the appended claims.

What is claimed is:

1. For use in the receiver of a Doppler radar, frequency tracking circuitry for locking the output signal of a digitally controlled oscillator with an echo signal from a selected target, such echo signal being amplitude limited, such circuitry comprising:
   a. an exclusive OR gate, responsive to the output signal and to the echo signal, for producing a square wave signal, the degree of asymmetry thereof being indicative of the difference in a frequency between the two applied signals;
   b. means for producing a digital correction signal proportional to the degree of asymmetry of the square wave signal; and,
   c. means, responsive to the digital correction signal, for changing the frequency of the output signal of the digitally controlled oscillator to reduce the degree of asymmetry of the square wave signal to a minimum.

2. Frequency tracking circuitry as in claim 1 wherein the first-named means includes:
   a. a clock pulse generator for producing clock pulses at the Nyquist rate for the echo signal having the highest frequency;
   b. first and second gating means, enabled during mutually exclusive periods of time during each reception time of an echo signal by the square wave signal for passing clock pulses;
   c. a binary up-down counter, responsive to the clock pulses passed by the first and the second gating means, for counting the difference between the number of clock pulses passed by the first gating means and the number of clock pulses passed by the second gating means to derive an average difference count during a plurality of reception times; and,
   d. a binary adder, responsive to the average difference count in the binary up-down counter and to the clock pulses passed by the first and the second gating means, for producing the digital correction signal.

3. Frequency tracking circuitry as in claim 2 having, additionally:
   a. means, responsive to the output signal of the digitally controlled oscillator, for producing a digital indicating signal corresponding to the digital correction signal but displaced in phase therefrom by 90°; and,
   b. means, responsive to the digital indicating signal and to the echo signal, for indicating when the two are in phase.

4. Frequency tracking circuitry as in claim 3 having, additionally, means, responsive to the digital indicating signal, for converting such signal to a sine wave signal of like periodicity.

* * * * *